Feb. 9, 1971   C. W. BRISK ET AL   3,561,299
PULSATING COOLANT ADAPTER
Filed May 6, 1969
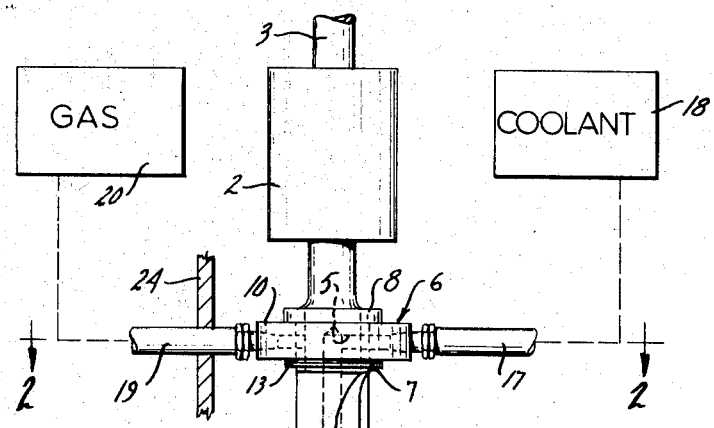
FIG_1
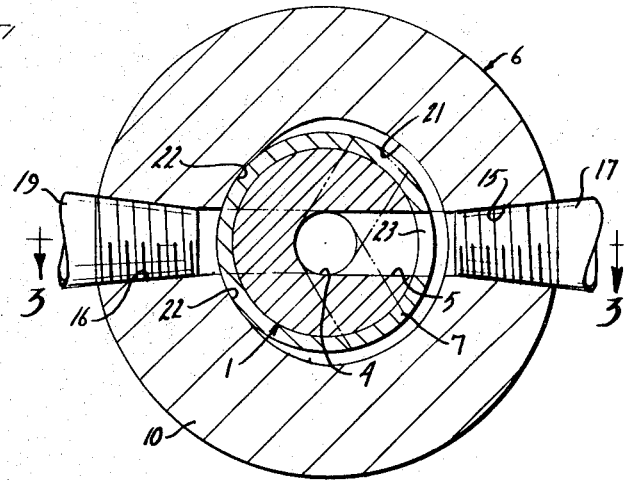
FIG_2
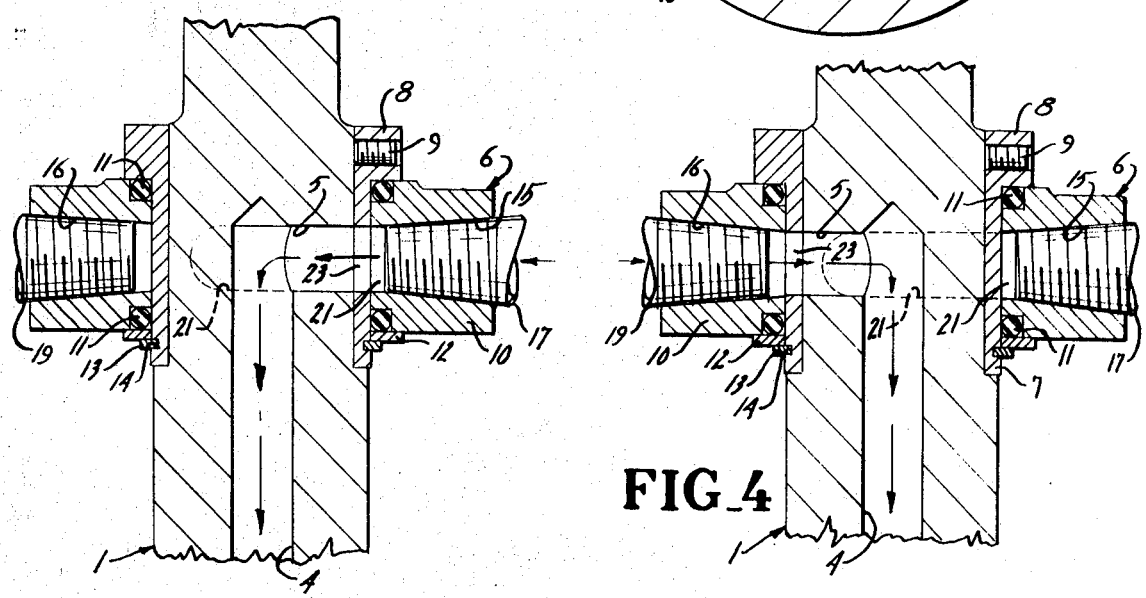
FIG_3   FIG_4
INVENTORS
CLYDE W. BRISK
ADAM A. SCHILLER
BY
Attorneys

United States Patent Office 3,561,299
Patented Feb. 9, 1971

3,561,299
PULSATING COOLANT ADAPTER
Clyde W. Brisk and Adam A. Schiller, Waukesha, Wis.,
assignors to Waukesha Cutting Tools, Inc., Waukesha,
Wis., a corporation of Wisconsin
Filed May 6, 1969, Ser. No. 822,247
Int. Cl. B23b 51/06
U.S. Cl. 77—55                                           5 Claims

ABSTRACT OF THE DISCLOSURE

An adapter for use with a spade drill or the like which has a coolant passage extending therethrough. A bushing is mounted on the tool for rotation therewith, and a collector ring is concentrically mounted on the bushing. The collector ring is fixed against rotation. A plurality of valve openings alternately connect the drill passage with a source of coolant or air. The coolant flow is substantially continuous, interrupted by short bursts of air to provide a pulsing effect.

BACKGROUND OF THE INVENTION

This invention relates to a pulsating coolant adapter for use in connection with rotary cutting tools, such as spade drills.

Such cutting tools have often been provided with a generally axial bore through which coolant passes for discharge adjacent the cutting end. The coolant also assists in chip removal.

SUMMARY OF THE INVENTION

In deep vertical hole and other type drilling, it has sometimes been found that coolant flow is not sufficient to adequately remove chips which accumulate in the bore during drilling. It has also been found that this problem can be effectively reduced by providing a pulsating form of coolant flow.

The present invention is directed to an adapter for use with cutting tools, and which provides an alternating flow of coolant and gas to provide pulsations for assistance in chip removal.

DESCRIPTION OF THE DRAWING

The accompanying drawing illustrates the best mode contemplated by the inventors for carrying out the invention.

In the drawing:

FIG. 1 is a schematic side elevation of a cutting tool having the pulsating coolant adapter, and showing other associated mechanism;

FIG. 2 is a transverse section taken on line 2—2 of FIG. 1;

FIG. 3 is a view taken on line 3—3 of FIG. 2; and

FIG. 4 is a view similar to FIG. 3 with the valve in a different position.

DESCRIPTION OF THE PREFERRED EMBODIMENT

As best shown in FIG. 1 of the drawing, the adapter of the invention is designed for use with a spade drill 1 or the like which may be secured at its upper end by a chuck 2 to the spindle 3 of a suitable machine tool, such as a drill press. Drill 1 is provided with an axial bore 4 which communicates between the lower drill cutting end and a single radial bore 5 which opens outwardly at the upper end portion of the drill shank. Bores 4 and 5 form a continuous coolant passage through the drill.

It is desired to provide a pulsating coolant flow through the coolant passage. For this purpose, and in accordance with the invention, an adapter 6 is mounted on drill 1 at the entrance to radial bore 5.

As shown, adapter 6 comprises a central bushing 7 adapted to surround tool 1 and having an annular flange 8 at one end. A set screw 9 extends radially through flange 8 for lockingly securing the bushing to the drill for mutual rotation thereof.

An annular collector ring 10 is mounted concentrically over bushing 7 with suitable O-ring seals 11 therebetween. The ring-bushing assembly is held together, as by a washer 12 and by a split lock ring 13 disposed in a groove 14 in the bushing. Collector ring 10 is thus confined between flange 8 and lock ring 13.

In accordance with the invention, adapter 6 includes means to provide alternating pressurized flow of liquid coolant and gas through drill 1. For this purpose, collector ring 10 is provided with opposed threaded radial inlet openings 15 and 16. Opening 15 is connected via conduit 17 to a suitable source 18 of continuously supplied coolant, such as oil or water. Opening 16 is connected via conduit 19 to a suitable source 20 of gas, such as air.

Opening 16 communicates directly radially to the interior of collector ring 10. Opening 15, on the other hand, not only connects directly radially to the interior of ring 10, but also connects to the central portion of an arcuate interrupted groove 21 on the inner collector ring surface. Groove 21 has an annular extent of about 260°, leaving ungrooved portions 22 between the ends of groove 21 and gas inlet opening 16.

To complete the rotary valve means described above, bushing 7 is providing with an opening 23 which is in constant permanent communication with drill bore 5.

Collector ring 10 is fixed against rotary movement in any well-known way, as by member 24 on the machine.

The operation of the device is as follows: As drill 1 rotates, it carries with it bushing 7. For approximately 260° of rotation of drill 1, and as shown in FIG. 3, coolant will be connected from source 18 through conduit 17, opening 15, groove 21, opening 23 and bores 5 and 4. When opening 23 reaches ungrooved portion 22, all flow of any kind to the drill will be cut off. As opening 23 reaches opening 16, and as shown in FIG. 4, gas will be connected from source 20 through conduit 19, opening 16, opening 23 and bores 5 and 4. Continued turning of drill 1 will again cut off all flow to the drill, and will then reconnect the drill to the coolant.

Due to the high speed of drill rotation, the period of coolant flow is essentially continuous, interrupted only by successive very quick coolant shut off periods, which each period including a short blast of gas to the drill. This creates the desired pulsating effect.

Various modes of carrying out the invention are contemplated by the inventors.

The following claims particularly point out and distinctly claim the subject matter which is regarded as the invention.

1. For use in a machine tool having a rotary cutting tool provided with a coolant passage extending between the cutting and tool shank ends thereof, the combinationtion comprising:
 (a) means to supply a substantially continuous flow of pressurized coolant to said passage through the shank end of the cutting tool,
 (b) means to successively interrupt the flow of coolant,
 (c) and means to supply a quick flow of pressurized gas to said passage through the shank end of the cutting tool while the coolant flow is interrupted.

2. For use in a machine tool having a rotary cutting tool provided with a coolant passage extending between the cutting and tool shank ends thereof, means to alternately supply pressurized coolant and gas to said coolant passage through the shank end of the cutting tool, said means comprising:
  (a) a bushing for attachment to the cutting tool and adapted to rotate therewith,
  (b) a collector ring concentrically mounted on said bushing and adapted to remain fixed during tool rotation,
  (c) and rotary valve means provided by said bushing and collector ring for supplying a substantially continuous flow of pressurized coolant to said passage, with said flow being successively interrupted,
  (d) and with said valve means supplying a quick flow of pressurized gas to said passage while the coolant flow is interrupted.

3. The device of claim 2 wherein said valve means comprises:
  (a) first means providing an opening in said bushing for permanent communication with said passage,
  (b) second means providing an opening in said collector ring for connection between a source of coolant and said first means,
  (c) an interrupted groove in said collector ring for connecting said coolant source with said first means during a substantial portion of cutting tool rotation, and
  (d) third means providing an opening between the ends of said groove for connection between a source of gas and said first means.

4. The device of claim 3 wherein said interrupted groove extends arcuately for about 260°.

5. In a machine tool, the combination comprising:
  (a) a rotary cutting tool having a coolant passage extending between the cutting and tool shank ends thereof,
  (b) a bushing locked to said cutting tool and adapted to rotate therewith,
  (c) said bushing having a first opening therein which is in permanent communication with said coolant passage,
  (d) a collector ring concentrically mounted on said bushing,
  (e) means to prevent rotation of said collector ring during cutting tool rotation,
  (f) said collector ring providing second and third openings communicable with said first opening during cutting tool rotation,
  (g) means for supplying pressurized coolant and gas to said second and third openings, respectively,
  (h) and an interrupted groove in said collector ring, said groove being in communication wtih said second opening,
  (i) said third opening being disposed between the ends of said groove,
  (j) the construction being such that, upon rotation of said cutting tool, coolant will be substantially continuously supplied to said passage, with said flow being successively interrupted and with gas being supplied to said passage during the interruption.

References Cited
UNITED STATES PATENTS 3,342,086   9/1967   Borman et al.

FOREIGN PATENTS 820,308   9/1959   Great Britain.

FRANCIS S. HUSAR, Primary Examiner

U.S. Cl. X.R.

29—106; 77—68